Nov. 16, 1965    L. BONO    3,218,493
DEVICE COMPRISING A DYNAMO AND AN ELECTROMAGNETIC CLUTCH FOR
REGULATING THE SPEED OF A DRIVEN SHAFT
Filed July 5, 1961

Inventor
Luigi Bono
By Stevens Davis Miller & Mosher
Attorneys

United States Patent Office 3,218,493
Patented Nov. 16, 1965

3,218,493
DEVICE COMPRISING A DYNAMO AND AN ELECTROMAGNETIC CLUTCH FOR REGULATING THE SPEED OF A DRIVEN SHAFT
Luigi Bono, Pavia, Italy, assignor to Necchi Societa per Azioni, Pavia, Italy
Filed July 5, 1961, Ser. No. 121,929
Claims priority, application Italy, Jan. 10, 1961, 606/61
4 Claims. (Cl. 310—95)

This invention relates to devices for regulating the speed of a driven shaft, and more particularly to a device for regulating the speed of said shaft so as to maintain it substantially constant independently of variations of the resistant torque imposed on the shaft by its load.

A main object of the invention is to provide a novel and improved device for regulating the speed of a driven shaft connected to a driving shaft through an electromagnetic clutch, said device including a generator operatively driven from the driving shaft through said clutch and being arranged to vary the effective voltage applied to the magnetizing winding of the clutch in accordance with changes in speed of the driven shaft in such a manner as to control the slippage between the driving shaft and the driven shaft to compensate for the variations in speed of the driven shaft and to hold the speed of the driven shaft substantially constant.

A further object of the invention is to provide an improved speed control means for a shaft which is driven from a driving shaft through an electromagnetic clutch, said speed control means including a generator arranged to develop a voltage opposing the normal voltage applied to the energizing winding of the clutch in a manner to cause the slippage of the clutch to vary so as to compensate for changes in speed of the driven shaft caused by loading thereof and to maintain the speed of the driven shaft substantially constant under varying loading conditions.

Further objects and advantages of the invention will become apparent from the following description and claims, and from the accompanying drawings, wherein:

Figure 1:
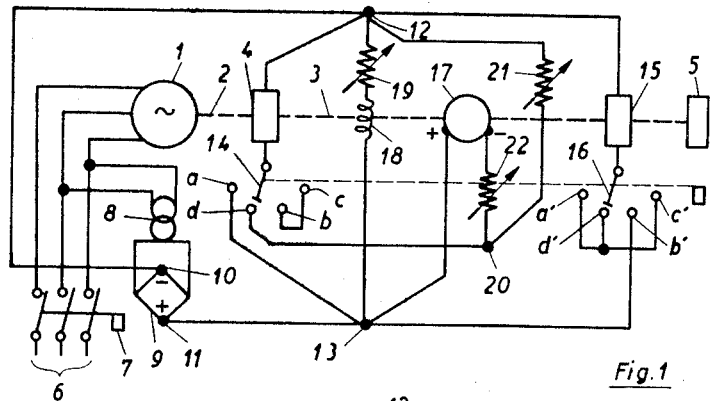
FIGURE 1 is a wiring diagram of a system provided with speed control means according to the present invention.

Referring to the drawings, and more particularly to FIGURE 1, an electric motor 1 is provided with a shaft 2 which is connected to a driven shaft 3 through an electromagnetic clutch 4 of conventional construction. Clutch 4 may be, for example, an electromagnetic power clutch of the type disclosed in applicant's Italian patent application No. 3624/60. Clutch 4 can be of the induction (eddy-current) type, of the electromagnetic-power (electro-fluid) type or any other conventional type which permits gradual regulation of the torque without slippages of long duration giving rise to damaging heating or wear.

Driven shaft 3 drives a load 5. Motor 1 is energized from a three-wire line designated generally at 6, through a main switch 7. Connected to two of the supply line wires on the load side of the switch 7 is the primary of a transformer 8. The secondary of transformer 8 is connected to the input terminals of a full-wave bridge type rectifier 9. The output terminals 10 and 11 of the rectifier are connected respectively to a pair of terminals 12 and 13.

The magnetizing winding of the clutch 4 is connected between terminal 12 and the pole of a switch 14, said pole being selectively engageable with stationary contacts $a$, $d$, $b$ and $c$ of said switch. Contacts $b$ and $c$ of said switch are connected together, as shown. Contact $a$ is connected to the terminal 13. Contact $d$ is connected to a terminal 20.

An electromagnetic brake 15 of conventional construction utilized in applicant's copending application Serial No. 121,930 filed July 5, 1961, is provided on the driven shaft 3. The magnetizing winding of brake 15 is connected between terminal 12 and the pole of a switch 16, said pole being ganged together with the pole of switch 14 for simultaneous operation by a common actuator 16'. The pole of switch 16 is selectively engageable with respective fixed contacts $a'$, $d'$, $b'$ and $c'$, being engageable with said respective fixed contacts simultaneously with the engagement of the pole of switch 14 with its respective contacts $a$, $d$, $b$ and $c$. Contacts $a'$, $d'$ and $c'$ are connected together, as shown. Contact $b'$ is connected to terminal 13.

As will be seen from FIGURE 1, when the pole of switch 14 engages contact $a$, the winding of clutch 4 is connected to the output terminals 10 and 11 of the rectifier 9 through the terminals 12 and 13, while brake 15 remains deenergized. Similarly, when the pole of switch 16 is connected to contact $b'$, the brake is energized and clutch 4 remains deenergized.

When the pole of switch 14 engages contact $a$, clutch 4 is directly connected to rectifier 9 and there is full or maximum excitation of the clutch 4 whereby there is minimum slippage between shafts 2 and 3. When the pole of switch 16 engages contact $b'$, clutch 4 is deenergized and brake 15 stops the shaft 3.

When the poles of switches 14 and 16 respectively engage the contacts $c$ and $c'$, the shaft 3 is free.

When the poles of switches 14 and 16 respectively engage the contacts $d$ and $d'$, the speed of shaft 3 is regulated by a circuit arrangement now to be described.

Keyed to the driven shaft 3, or drivingly connected in any suitable manner to this shaft or to the load shaft 5, is a tachometric generator or dynamo 17 having a field winding 18 which is connected between the terminals 12 and 13 in series with a variable resistor 19. As will be presently described, the output of the generator 17 is connected in circuit with the terminal 13 and contact $d$ so that the generator output voltage opposes the voltage supplied by rectifier 9, whereby the magnetizing winding of clutch 4 receives a reduced voltage, thereby causing slippage between the driving shaft 2 and the driven shaft 3.

The positive output terminal of generator 17 is connected to terminal 13, which is connected in turn to the positive output terminal 11 of the rectifier 9. The negative output terminal of generator 17 is connected through a variable resistor 22 to terminal 20. A variable resistor 21 is connected between terminal 20 and terminal 12.

When the pole of switch 14 engages contact $d$, the magnetizing winding of clutch 4 is connected to the output terminals of rectifier 9 through the armature of generator 17 and the variable resistor 22, with the output voltage of the generator opposing the output voltage of the rectifier. Under these conditions, the supply voltage to the energizing winding of the clutch is reduced in a manner to produce an amount of slippage between driving shaft 2 and driven shaft 3 in accordance with the speed of the driven shaft. In this way, if the resistant torque developed by the load 5 increases so that shaft 3 tends to decrease its speed, the output voltage of generator 17 tends to decrease, increasing the effective supply voltage to the energizing winding of clutch 4. Conversely, if the resistant torque decreases, the speed of shaft 3 tends to increase, but this increases the output voltage of generator 17, thus reducing the effective supply voltage to the energizing winding of clutch 4 and causing the amount of slippage to increase. In both cases, there is a variation in excitation of clutch 4 which tends to counteract the variations in speed of the shaft 3. The device therefore operates to control the speed of the driven shaft 3 so as to maintain it substantially constant, independently of variations in the resistant torque developed by the load 5. The value of the constant speed depends on the adjustment of the variable resistors 19, 21 and 22.

Figure 2:
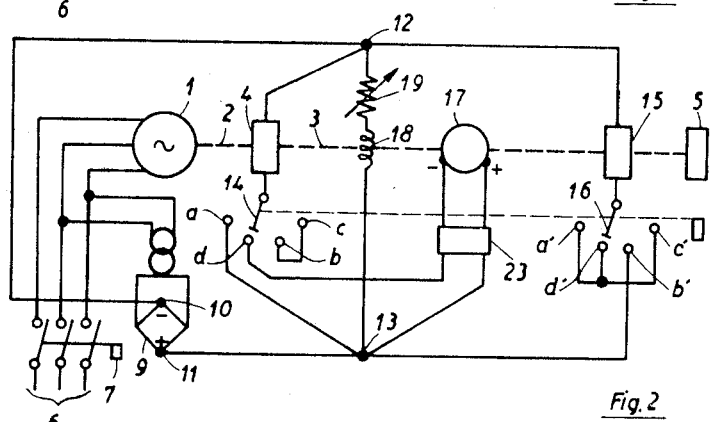
FIGURE 2 is a wiring diagram of a system similar to FIGURE 1 but showing a modified speed control means according to this invention wherein the generator is connected to the energizing winding of the electromagnetic clutch through an amplifier.

The circuit arrangement of FIGURE 2 is similar to that of FIGURE 1 except that the output of the generator 17 is connected to the contact $d$ and the terminal 13 through an amplifier 23, the calibration of which replaces the variable resistors 21 and 22 of FIGURE 1.

Figure 3:
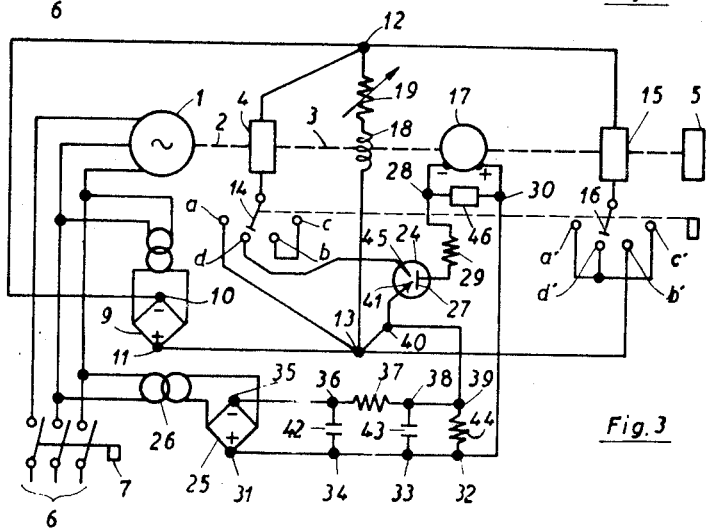
FIGURE 3 is a wiring diagram of a system similar to FIGURE 2, but showing a further modification of the speed control means wherein the amplifier comprises a transistor controlled by the difference between the generator output voltage and a reference voltage.

The circuit arrangement of FIGURE 3 is similar to that of FIGURE 2 except that the generator 17 is connected to the contact $d$ and the terminal 13 through an amplifier shown as a transistor 24, operating also as a variable resistor. The current amplification of the transistor is controlled by a control voltage comprising the difference between the output voltage of the generator 17 and a constant reference voltage supplied by an auxiliary rectifier 25.

The input terminals of rectifier 25 are connected to the terminals of the secondary of a transformer 26 whose primary is connected to two of the wires of the three-wire supply line 6 on the load side of the main switch 7. The base 27 of the transistor is connected to the negative terminal 28 of generator 17 through a resistor 29. The positive terminal 30 of the generator is connected to the positive output terminal 31 of rectifier 25 through respective terminals 32, 33 and 34. The negative output terminal 35 of rectifier 25 is connected to the emitter 41 of the transistor 24 through a terminal 36, a resistor 37, and terminals 38, 39 and 40.

Connected respectively between terminals 34 and 36, 33 and 38, and 32 and 39 are the capacitor 42, the capacitor 43, and the resistor 44.

The collector 45 of the transistor is connected to the contact $d$ of switch 14.

In order to prevent damage to the transistor, a protective device 46, comprising a diode, is connected between the output terminals 28 and 30 of the generator. The diode 46 is a Zener diode which has the function of "cutting" the higher voltages produced by the generator which cannot be withstood by transistor 24.

While certain specific embodiments of a device to regulate the speed of a driven shaft have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a rotary driving member, a rotary driven member, an electromagnetic clutch connecting said driving member to said driven member, said clutch providing an amount of slippage between the driving member and the driven member inversely in accordance with the voltage applied to the clutch, a fixed voltage source, a variable voltage source including a generator coupled to said driven member and an amplifier connected to the output of the generator, said generator developing an output voltage proportional to the speed of the driven member, and circuit means including a selectively positionable switch means, said switch means being positionable in a first position whereby said clutch is placed in series across the output voltage of said fixed voltage source independently of said generator, said switch means being positionable in a second position whereby a series circuit is formed including said clutch, said fixed voltage source and said generator with the respective outputs of said fixed voltage source and said generator being aligned in opposition to each other whereby the voltage acting to energize said clutch is the net difference in voltage outputs between said fixed voltage source and said generator.

2. The combination of claim 1, further including an electromagnetic brake which is energizable to brake said driven member, said switch means being positionable in a third position whereby said clutch is de-energized and simultaneously said brake is placed in series across the output of said fixed voltage source.

3. The combination of claim 2, wherein said brake is de-energized with said switch means being in either said first or second positions thereof.

4. The combination of claim 2, said switch means being positionable in a fourth position whereby both said clutch and said brake are de-energized and whereby said driving and driven members are free to rotate independently of each other.

References Cited by the Examiner
UNITED STATES PATENTS

| | | |
|---|---|---|
| 2,788,104 | 4/1957 | Mason. |
| 2,816,635 | 12/1957 | Danly et al. _____ 192—12.2 |
| 2,850,650 | 9/1958 | Meacham _____ 307—88.5 |
| 2,850,654 | 9/1958 | Jaeschke _____ 310—94 |
| 3,032,668 | 5/1962 | Robinson et al. _____ 192—84 X |
| 3,050,611 | 8/1962 | Kamide _____ 307—88.5 X |

ORIS L. RADER, *Primary Examiner.*

MILTON O. HIRSHFIELD, THOMAS J. HUKEY,
*Examiners.*